United States Patent [19]
Eiler

[11] 3,720,280
[45] March 13, 1973

[54] MULTI-AXLED VEHICLE CHASSIS
[75] Inventor: Peter Eiler, Langenfeld, Germany
[73] Assignee: Leo Gottwald K.G., Dusseldorf, Germany
[22] Filed: July 15, 1970
[21] Appl. No.: 55,085

[30] Foreign Application Priority Data

July 19, 1969 Germany...................P 19 36 919.8

[52] U.S. Cl..................180/64 R, 180/85, 212/38, 280/106 R
[51] Int. Cl. ..............................B62d 21/02
[58] Field of Search............180/54, 70, 55, 56, 57, 1, 180/85; 212/38; 280/106

[56] References Cited

UNITED STATES PATENTS

| 2,209,392 | 7/1940 | Edwards | 212/38 |
| 2,855,110 | 10/1958 | Prichard | 212/38 |
| 2,286,416 | 6/1942 | Holmstrom | 180/54 F |
| 2,155,750 | 4/1939 | Best | 280/106 |
| 2,297,198 | 9/1942 | Borgward | 280/106 |
| 2,190,551 | 2/1940 | Swallow | 280/106 X |
| 3,378,094 | 4/1968 | Myers | 180/64 |

Primary Examiner—Leo Friaglia
Assistant Examiner—Milton L. Smith
Attorney—McGlew and Toren

[57] ABSTRACT

A mobile crane chassis has a driving motor mounted between the front and rear axles substantially below the upper surface of the chassis. The chassis has a backbone consisting of spaced upright longitudinal webs interconnecting upper and lower plates, the motor being mounted between the longitudinal webs.

8 Claims, 6 Drawing Figures

PATENTED MAR 13 1973        3,720,280
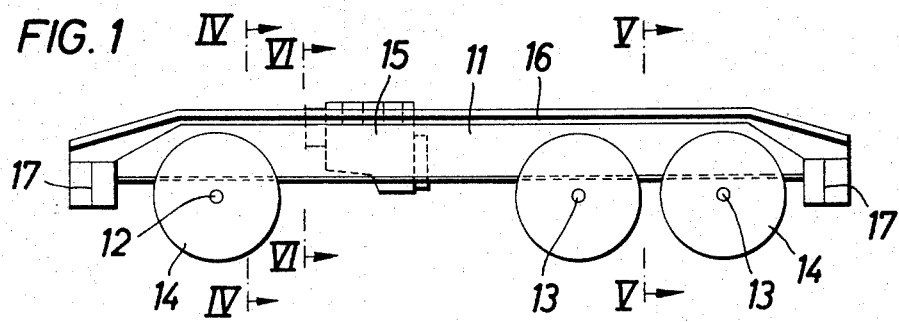
FIG. 1
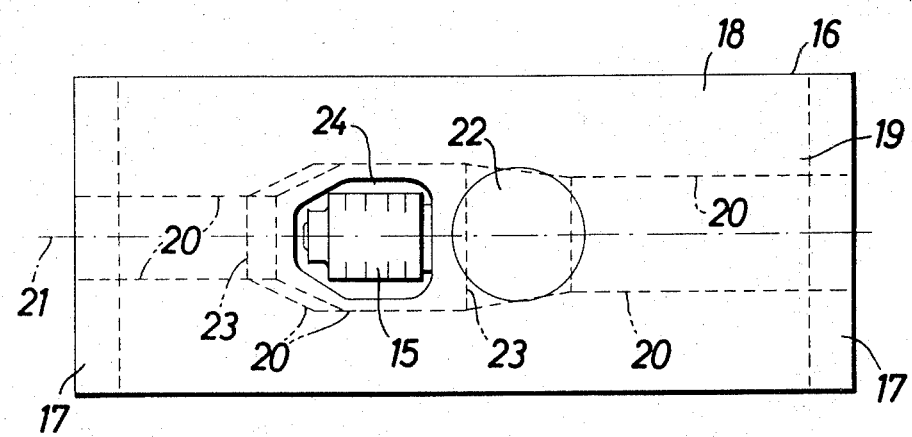
FIG. 2
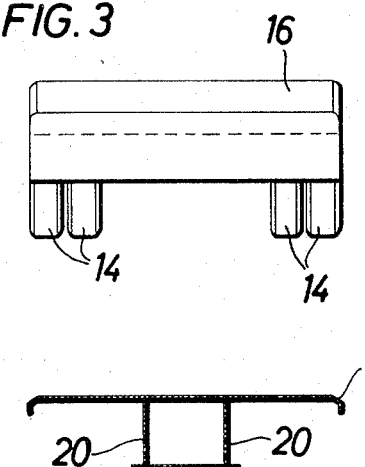
FIG. 3
FIG. 4
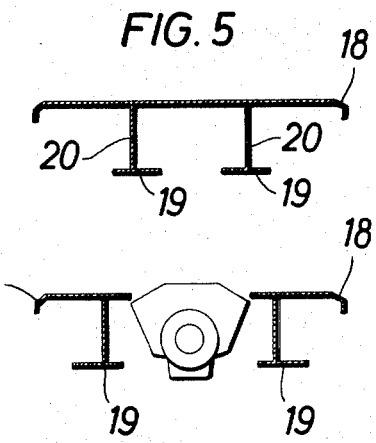
FIG. 5
FIG. 6
INVENTOR
PETER EILER
BY McGlew & Toren
ATTORNEYS

MULTI-AXLED VEHICLE CHASSIS

In known mobile cranes the crane super-structure is often mounted to rotate on a turntable on a multiaxled, motor driven chassis, the driving motor being situated over the front axle of the vehicle. The motor drives the front and rear axles through a clutch and gearbox, the rear axle usually being a tandem axle.

Nowadays the power requirements from the motor are greater than they used to be and consequently the large motor, situated over the front axle, results in a very high center of gravity for the vehicle, reducing its stability. A further difficulty arises due to the increasing sizes of the motors, which are becoming so large that there is often insufficient space for installing them above the front axle. Furthermore the large motor, installed in this position, reduces the available steering angle of the front wheels, particularly if the front wheels have twin tires, which are themselves becoming increasingly necessary due to the increased loads. The powerful motors used today are becoming so wide that the steering angle remaining for the front wheels is reduced unacceptably. It is also now becoming apparent that the known chassis structures are not sufficiently stiff in regard to bending and torsion.

The object of the present invention is to provide a multiaxled, motor driven chassis particularly suitable for mobile cranes, simple and compact in construction, stiff against bending and torsion even under the highest loads, and which still allows the front wheels a good steering angle, even if they are equipped with wide twin tires.

This problem is solved by the invention in that the driving motor is mounted within the vehicle chassis, between the front and rear axles, in such a way that the driving motor, (including its gearbox if provided with a gearbox), is situated substantially below the upper surface of the chassis. This arrangement allows the front wheels to be given plenty of steering angle, the motor being positioned neither too near the front wheels nor near the back wheels. Consequently the vehicle can be steered easily and effectively even if quite a large motor is used.

A further advantage obtained is a very low center of gravity for the vehicle, ensuring good stability and safety. This advantage is still greater if the motor is positioned with its longitudinal axis in the central longitudinal plane of the chassis.

The drive motor is preferably positioned between longitudinal upright webs which themselves extend between and interconnect an upper structural plate and a lower structural plate. This arrangement allows the chassis to accept in favorable ways all the loads arising in the operation of the crane.

The chassis according to the invention is unusually stiff in the presence of both bending and torsion loads. In order to remove in advance any difficulties which might arise in this regard the upright connecting webs are preferably splayed outwards in the rearward direction forward of the motor, to accommodate the motor, and splayed inwards again aft of the motor under a turntable for supporting the crane superstructure, so that at the splayed region the webs form angles with each other and with the central longitudinal plane of the chassis. Fore and aft of the splayed parts the longitudinal webs may then extend over the remainder of the chassis parallel to each other and to the central longitudinal plane of the chassis, a certain distance apart. Furthermore forward of the motor, and forward of the splayed parts, that is to say in the region of the front axle, the longitudinal webs are preferably closer together than they are aft of the drive motor in the region of the rear axle, which is preferably a tandem axle.

Particularly good stability is obtained if, fore and aft of the motor, the webs are connected together by transverse stiffening webs, and if the forward transverse web and the longitudinal webs where they are splayed outward forward of the drive motor are of heavier construction or are reinforced.

For taking the bending and torsion loads in the region of the front axle the longitudinal webs and plates may form a closed box structure, whereas in the region of the drive motor both the upper and the lower structural plates have apertures, and in the region of the rear axle the upper structural plate has no aperture, whereas the lower structural plate has an aperture. Over the entire length of the chassis the upper structural plate is preferably wider than the lower structural plate.

An example of a crane chassis constructed in accordance with the invention is illustrated in the accompanying drawings, in which:

FIG. 1 is a side elevation;
FIG. 2 is a plan;
FIG. 3 is a front elevation;
FIG. 4 is a section taken along the line IV—IV. in FIG. 1;
FIG. 5 is a section taken along the line V—V. in FIG. 1; and,
FIG. 6 is a section taken along the line VI—VI. in FIG. 1.

As shown in FIGS. 1 and 3, the chassis 11 for a crane structure which is not shown in the drawing has a front axle 12 and two rear axles 13 arranged in tandem formation. The rear wheels and/or the front wheels have wide tires 14 which can if desired be twin tires. An internal combustion engine 15, which is of the kind having its cylinders in "V" or "in line" formation is installed in the chassis 16 between the front axle 12 and the forward rear axle, or middle axle 13. The motor 15, including its gearbox, which is not shown in the drawing, is installed in the chassis 16 in such a way that it does not or does not appreciably project above the upper surface of the chassis, which is approximately at the level of the upper surfaces of the tires, the motor being installed in such a way that it does not limit the steering angles of the front wheels. At the front and rear ends of the chassis 16 there are box beams 17 for auxiliary support legs.

With the drive motor 15 installed within the middle part of the chassis 16 the chassis must be constructed so that it is fully capable of taking the extremely high bending and torsion stresses, particularly if the motor 15 is a large one. To ensure this the chassis 16 consists of an upper plate 18 and a lower plate 19, connected together by upright connecting web plates 20. Near the front axle 12 and near the rear axle 13 the web plates 20 run parallel to each other a certain distance apart, disposed symmetrically on either side of the central longitudinal axis 21 of the chassis 16. On the other hand forward of the motor 15 the web plates 20 are angled outwards, with respect to the central longitudinal axis 21, to give room for the motor 15. Aft of the motor 15 the web plates 20 are angled inwards again. Between the motor 15 and the middle axle 13 there is mounted on the upper structural plate 18 a ball-bearing turntable 22, which is merely indicated in the drawing; for supporting the crane structure, which is not shown in the drawing. The web plates 20 of the chassis 16 are brought closer together under the turntable 22. The arrangement is such that the upper structural plate 18 is wider than the lower structural plate 19 over the entire length of the chassis 16. Forward and aft of the drive motor 15 there are transverse stiffening web plates 23 extending across between the two longitudinal web plates 20. The forward stiffening web plate 23 and the two web plates 20 just forward of the motor 15 are of heavier construction or are reinforced.

As shown in FIG. 4 the chassis 16 near the front axle 12 forms a box structure consisting of the upper structural plate 18, the two upright web plates 20 and the lower structural plate 19. This box structure is fully capable of taking the torsion stresses which arise in the neighborhood of the front axle 12.

As shown in FIG. 5, in the region of the rear axle 13 the chassis 16 forms an open box, which is closed at the top by the continuous structural plate 18 but open at the bottom in that the lower structural plate 19 has an aperture in this region.

On the other hand, as shown in cross section in FIG. 6, in the region of the motor 15 both the upper structural plate 18 and the lower structural plate 19 are open, there being apertures in these two structural plates in this region. The aperture in the upper structural plate 18 is indicated at 24 in FIG. 2.

However although the cross section shown in FIGS. 4 to 6 differ from each other, nevertheless they all have this in common that the upper structural plate 18 extends, as a stressed member, right across the full width of the vehicle whereas, in contrast to this, in the hitherto known vehicles of this kind only the middle longitudinal beams or box beams give the chassis its structural strength.

I claim:

1. A multi-axled vehicle chassis for mobile cranes having a front axle and a rear axle, said chassis comprising a longitudinal chassis frame extending in the direction between the front axle and the rear axle, and disposed symmetrically about its longitudinal axis, a driving motor and transmission extending along the longitudinal axis of said chassis frame and located in said chassis frame below its upper surface intermediate the front axle and the rear axle, wherein the improvement comprises that said chassis frame consists of at least two upright web plates extending substantially over the entire length of said chassis with each of said plates located on an opposite side of said driving motor, a horizontally arranged upper plate extending transversely across the upper ends of said web plates and a horizontally arranged lower plate extending transversely across the lower ends of said web plate, said upper plate in the forward and rearward regions of said chassis extending transversely over the entire width of said chassis frame, said chassis frame defined by said web plates and said upper and lower plates has a box profile closed on all sides in the range of the front axle, with the box profile open in said upper plate and lower plate in the range of said driving motor, and with the box profile closed in said upper plate and open in said lower plate in the range of said rear axle.

2. A multi-axled vehicle chassis, as set forth in claim 1, characterized in that said upper plate is wider over the entire length of said chassis frame than said lower plate.

3. A multi-axled vehicle chassis, as set forth in claim 2, wherein a horizontally arranged turntable is mounted on said upper plate intermediate the front and rear axles and rearwardly of said driving motor, and said longitudinally extending web plates in the forward range of said driving motor and in the range of said turntable are disposed angularly to one another and also to the axis of symmetry of said chassis frame.

4. A multi-axled vehicle chassis, as set forth in claim 3, wherein at least two transversely extending web plates extend between and connect said longitudinally extending web plates with one said transverse web plate located at the forward end of said driving motor and the other said transverse web plate located at the rearward end of the driving motor.

5. A multi-axled vehicle chassis, as set forth in claim 4, characterized in that said forward transverse web plate and said longitudinal web plates extending angularly to one another in the forward range of said driving motor are reinforced.

6. A multi-axled vehicle chassis, as set forth in claim 5, characterized in that said longitudinally extending web plates located forwardly of said forward transverse web plate, intermediate the angled portions of said longitudinal web plates at the forward and rearward ends of said driving motor and rearwardly of said turntable are disposed in parallel relationship with the axis of symmetry of said chassis frame.

7. A multi-axled vehicle chassis, as set forth in claim 6, characterized in that said transverse web plate located at the forward end of said driving motor is disposed closer to said front axle than said transverse plate located at the rearward end of said driving motor is located relative to said rear axle.

8. A multi-axled vehicle chassis for mobile cranes, said chassis having a driving motor and means mounting said motor within said vehicle chassis between a front axle and a rear axle in such a way that said motor is situated substantially below the upper surface of said chassis, said chassis comprising an upper structural plate, a lower structural plate spaced vertically below said upper structural plate, and a pair of laterally spaced longitudinally extending upright webs interconnecting said upper and lower plates, said motor disposed between said webs, in the region of said front axle said longitudinal webs and said upper and lower plates form a closed box structure in the region of said motor said upper and lower structural plates having apertures therethrough, and in the region of said rear axle said upper structural plate extending across said webs and said lower structural plate having an aperture therethrough.

* * * * *